(12) United States Patent
Huang

(10) Patent No.: US 7,270,208 B2
(45) Date of Patent: Sep. 18, 2007

(54) BATTERY CARRIER SLIDING DEVICE OF AN ELECTRICAL WHEEL CHAIR

(75) Inventor: Chun-Yi Huang, Sikou Township, Chiayi County (TW)

(73) Assignee: Taiwan An I Co., Ltd. (TW)

( * ) Notice: Subject to any disclaimer, the term of this patent is extended or adjusted under 35 U.S.C. 154(b) by 44 days.

(21) Appl. No.: 11/323,673

(22) Filed: Dec. 30, 2005

(65) Prior Publication Data

US 2007/0151785 A1    Jul. 5, 2007

(51) Int. Cl.
*B60R 16/04*    (2006.01)
*B60K 1/00*    (2006.01)

(52) U.S. Cl. .................. 180/68.5; 180/907; 180/65.1
(58) Field of Classification Search ............ 180/68.5, 180/907, 65.1
See application file for complete search history.

(56) References Cited

U.S. PATENT DOCUMENTS

| | | | | |
|---|---|---|---|---|
| 3,003,573 | A * | 10/1961 | Lorenz .................. | 180/68.5 |
| 3,838,745 | A * | 10/1974 | Kappei .................. | 180/68.5 |
| 4,003,614 | A * | 1/1977 | Geer et al. ............ | 312/332.1 |
| 4,936,409 | A * | 6/1990 | Nix et al. .............. | 180/68.5 |
| 4,967,864 | A * | 11/1990 | Boyer et al. .......... | 180/65.1 |
| 5,301,765 | A * | 4/1994 | Swanson ............... | 180/68.5 |
| 5,542,488 | A * | 8/1996 | Nixon .................... | 180/65.1 |
| 5,585,205 | A * | 12/1996 | Kohchi .................. | 429/99 |
| 2002/0066609 | A1* | 6/2002 | Dignitti et al. ........ | 180/68.5 |
| 2004/0227440 | A1* | 11/2004 | Booker et al. ......... | 312/334.1 |
| 2005/0274556 | A1* | 12/2005 | Chaney .................. | 180/68.5 |

* cited by examiner

*Primary Examiner*—Christopher P. Ellis
*Assistant Examiner*—John R. Olszewski
(74) *Attorney, Agent, or Firm*—Schmeiser, Olsen & Watts

(57) ABSTRACT

The present invention provides a battery carrier sliding device for the electric wheelchair, wherein a battery box for the electric wheelchair can be disconnected or reconnected through a manual lockable unit. The present invention provides an improved design for a battery carrier sliding device for the electric wheelchair that utilizes lockable units to manually detach or reattach the battery box by pulling or triggering the lockable unit. The lockable unit is comprised of a connecting belt and two flexible inserting units, wherein holes are formed on the supporting units respectively to correspond the flexible inserting units so that the battery box can be located securely onto the electric wheelchair. The battery box is comprised of a carrying function in such that the structures or the types of batteries do not need to be altered. Various types of batteries can be utilized with the present invention. The present invention provides an improved battery box that can fulfill the needs of the market.

3 Claims, 6 Drawing Sheets

BATTERY CARRIER SLIDING DEVICE OF AN ELECTRICAL WHEEL CHAIR

BACKGROUND OF THE INVENTION

1. Field of Invention

The present invention relates to a battery carrier sliding device of an electric wheelchair. More particularly, the present invention relates to an improved battery carrier sliding device that can be dislocated or reassembled manually to the electric wheelchair with a single hand.

2. Description of the Related Art

The main purpose of the wheelchair is to provide a movable facility for disabled people. For those using a manual wheelchair, hands are used to push the wheel. The physical demand on disabled people is great. It is not only inconvenient, but it also restricts the traveling distance and the traveling speed. The electric wheelchair, on the other hand, provides an easy-to-use and convenient wheelchair for disabled people. The movement of the wheelchair and its traveling directions can be controlled easily through an electrical control system that does not require great physical demand to operate. However, most of the electric wheelchairs in the current market are comprised of a heavy battery box that creates inconvenience and is restrictive to those disabled people who are paralyzed in a majority of their muscular functions.

Taiwanese Patent, 308866, teaches a battery box for an electric wheelchair utilizing sliding devices that are located on both sides of the battery box. The sliding poles are formed on both sides of the seat of the electric wheelchair so that the battery box is located below the seat. An anti-sliding block is formed on each end of the sliding pole so that the battery box is prevented from sliding out from the sliding poles. However, the battery box design taught in the Patent 308866 has certain disadvantages. The design of the battery box of the electric wheelchair is restrictive in that only particular types of batteries can fit into the battery box. Moreover, in order to remove the battery box, the anti-sliding blocks and the sliding poles are required to be disassembled first before the battery box can be removed.

Taiwanese Patent 364356 shows a battery box for an electric wheelchair that utilizes the space below the seat of the electric wheelchair. The patent teaches a battery box in which both sides of the seat of the electric wheelchair are designed with space to locate batteries. A hole is formed respectively on both sides of the top portions of the space to locate the flexible inserting shaft. A circular supporting pole is formed respectively on the front part and the back part of the space to support the battery. A semi-circular shaped battery carrier is utilized to locate a battery positioned below the seat of the electric wheelchair. It is clear that in order to utilize such kind of batter box design, the battery must be able to fit into this kind of design, the semi-circular battery carrier. Further, the process of removing the battery involves the steps of removing the components of those devices below the seat, such as the flexible inserting shafts, so that the battery boxes can be removed from both sides of the electric wheelchair. To reconnect the battery box is to reverse the procedure. Therefore, it is obvious that this kind of battery box design is inconvenient when changing the batteries.

Another Taiwanese Patent, 469824, illustrates a battery box of an electric wheelchair that is comprised of a square-shaped supporting frame that is located horizontally beneath the seat of the electric wheelchair. A battery is located in a battery box in a square-shaped supporting frame. To alter or change the battery, the battery box must be manually pushed up, that is, perpendicular to the seat so that the battery box can be removed. The relocation of the battery box is to reverse the above-mentioned procedure. From the teaching of Patent 469824, removing the battery box or replacing the battery box requires certain components, such as the screws of the sliding poles, to be removed first. Moreover, a stop planet is utilized in Patent 469824 to prevent the battery box from sliding out of its position on the electric wheelchair. However, the stop planet is required to be removed first before the battery box can be disconnected or reconnected to the electric wheelchair.

Thus, it is obvious the above-mentioned battery box designs in prior arts require an extensive removal process of the components from the electric wheelchair in order to disconnect or reconnect the batter box. To change a battery in the battery box of these conventional designs, a considerable amount of time and energy would be necessary. Therefore, it is one of the main purposes of the present invention to provide an improved battery box design for the electric wheelchair that is easy to disconnect and reconnect manually. More particularly, the main objective of the present invention is to provide an improved battery box design that can be detached or reattached with a single hand.

SUMMARY OF THE INVENTION

It is an object of the present invention to provide a battery carrier sliding device for an electric wheelchair comprised of at least one sliding device, a battery box and a lockable unit. The sliding device is located on a supporting unit of the electric wheelchair, and the battery box is located on the sliding device. The battery box slides along in a horizontal direction of a centre-line point of two wheels of the electric wheelchair. A handle is formed on a locking surface of a lockable unit. The lockable unit is further comprised of a connecting belt and two flexible inserting units. The flexible inserting units are connected respectively to both ends of the connecting belt, wherein the two flexible inserting units are located respectively at both ends of a locking surface of the battery box.

Two holes are formed on the supporting unit, and those two holes of the supporting unit correspond to locate the two flexible inserting units so that the holes, the flexible inserting units and the connecting belt are connected in a same axis. The lockable unit is used to lock the battery box onto the electric wheelchair in order to restrict a horizontal sliding movement of the battery box along the centre-line point of the two wheels of the electric wheelchair. The flexible inserting units further are comprised of an inserting shaft, a flexible element and a cover, wherein the inserting shaft comprises a flexible end and a connecting end. The inserting shaft is inserted into the flexible element, and the cover shields the inserting shaft and the flexible element. The flexible end and the connecting end of the inserting shaft are both exposed outside the cover, both ends of the connecting belt of the lockable unit are connected respectively to the connecting ends of the two inserting shafts.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the invention. In the drawings.

DESCRIPTION OF THE PREFERRED EMBODIMENTS

Figure 1:
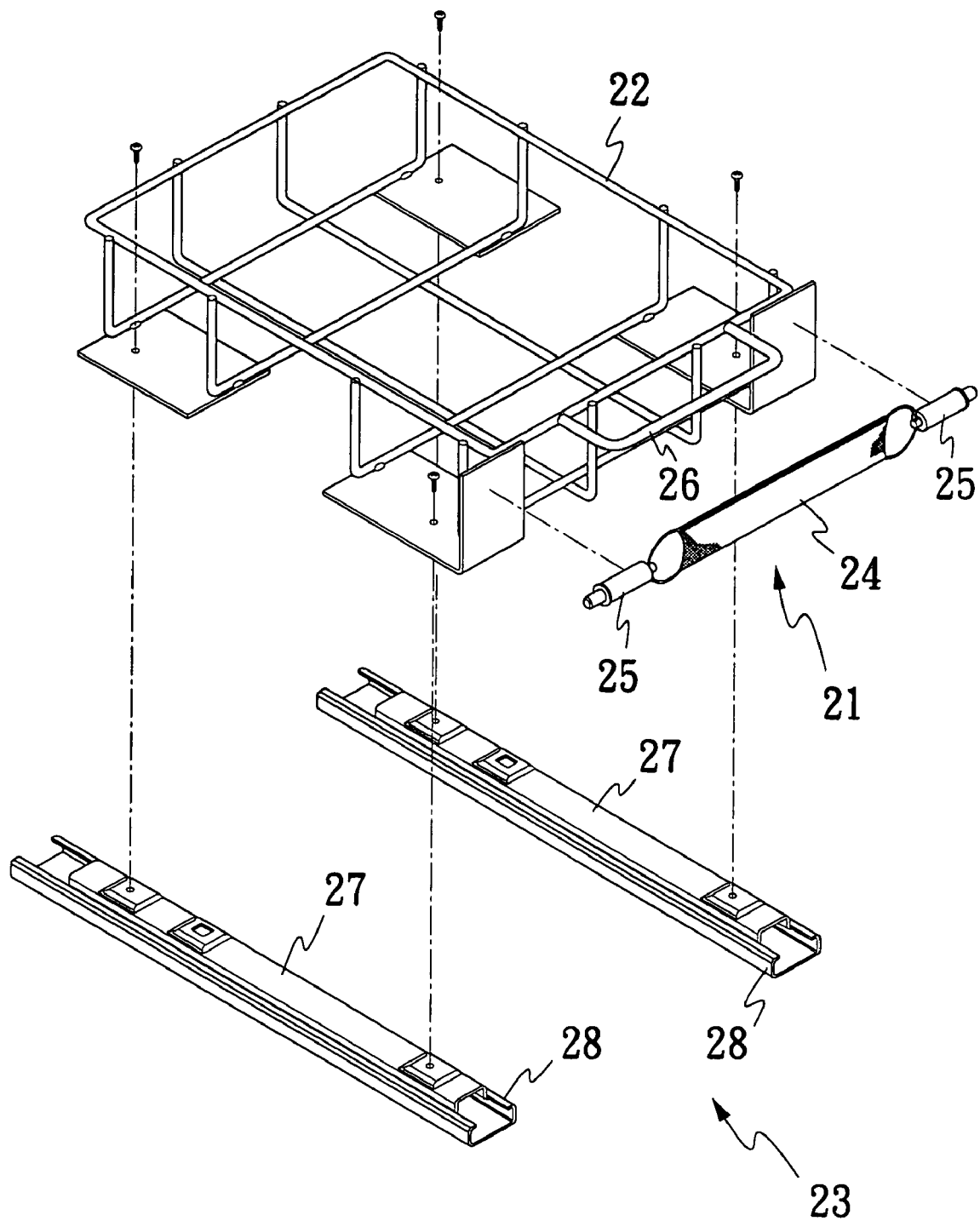
FIG. 1 is a 3-D assembled view of a battery carrier sliding device of an electric wheelchair in accordance with an embodiment of the present invention.

FIG. 1 shows a 3-D assembled view of a battery carrier sliding device of an electric wheelchair in accordance with a preferred embodiment of the present invention. The present invention provides a battery carrier sliding device of an electric wheelchair comprising a lockable unit 21, a battery box 22 and one sliding device 23. The lockable unit 21 further comprises a connecting belt 24 and a flexible inserting unit 25, the battery box 22 comprises a handle 26 located on a locking surface of the lockable unit 21. The sliding device 23 comprises a sliding base 27 and a sliding trench 28.

Figure 2:
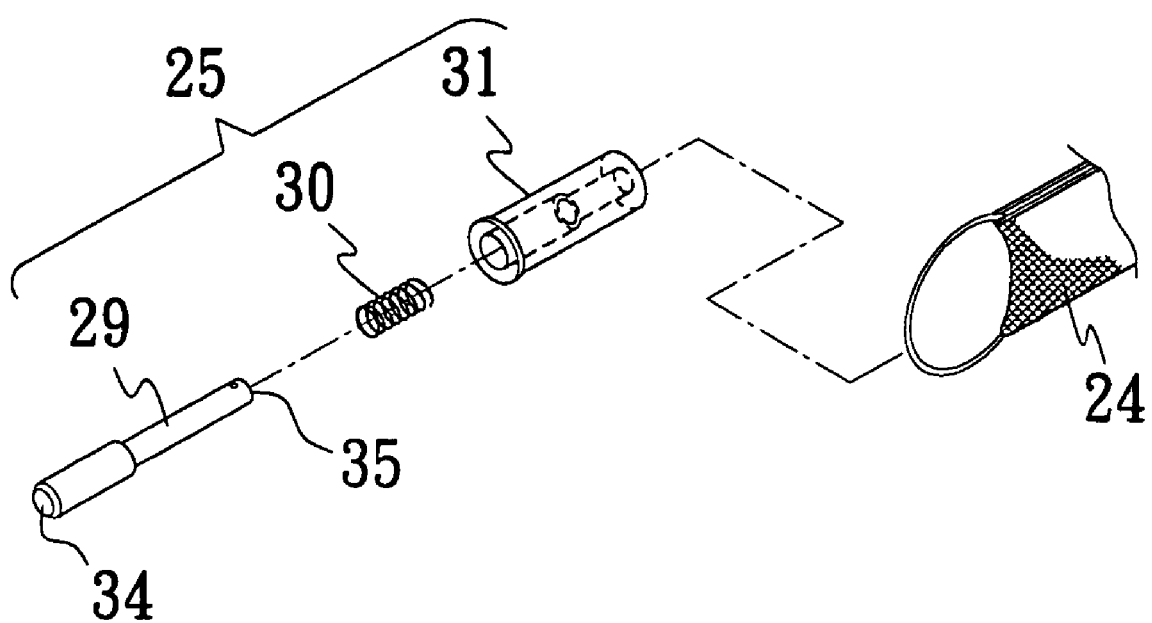
FIG. 2 is a partial 3-D view of a flexible inserting unit of the battery carrier sliding device of an electric wheelchair in accordance with the preferred embodiment of the present invention.
Figure 3:
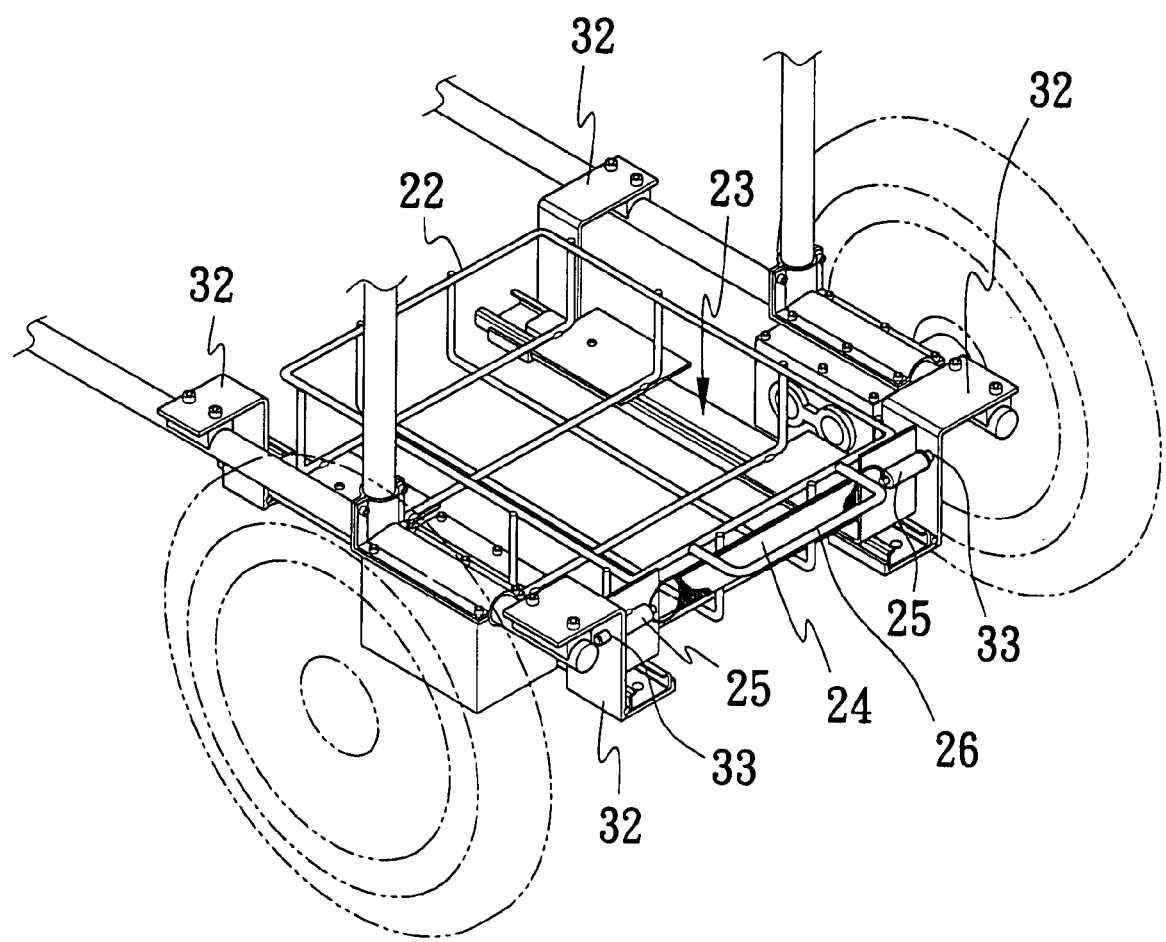
FIG. 3 is a 3-D view of one of practical embodiments utilizing the battery carrier sliding device of the electrical wheel chair in accordance with the preferred embodiment of the present invention.

FIG. 2 illustrates a partial 3-D view of a flexible inserting unit of the battery carrier sliding device of an electric wheelchair in accordance with the preferred example of the present invention. FIG. 3 shows a 3-D view of a practical example utilizing the battery carrier sliding device of the electric wheelchair. From FIGS. 2 and 3, the flexible inserting unit 25 comprises an inserting shaft 29, a flexible element 30, such as a spring, and a cover 31. The inserting shaft 29 further comprises a flexible end 34 and a connecting end 35, wherein the inserting shaft 29 is put inside the flexible element 30, and is then shielded with the cover 31. Both ends of the inserting shaft 29 are exposed outside the cover 31. Both ends of the connecting belt 24 are connected respectively to the connecting ends 35 of the inserting shaft 29 of the two flexible inserting units 25.

The two covers 31 of the two flexible inserting units 25 are connected respectively to the battery box 22. The sliding base 27 is located within the sliding trench 28, wherein the battery box 22 is located over two sliding bases 27 of the sliding device 23 so that the battery box 22 can slide along in a horizontal direction of a centre-line point of the two wheels of the electrical chair. However, the movement of the batter box 22 is not unlimited. Two sliding trenches 28 are located onto two supporting units 32 of the electric wheelchair as shown in FIG. 3. The supporting units 32 of the electric wheelchair comprise two holes 33 corresponding to locate the inserting shafts 29 of the two flexible inserting units 25.

Figure 4:
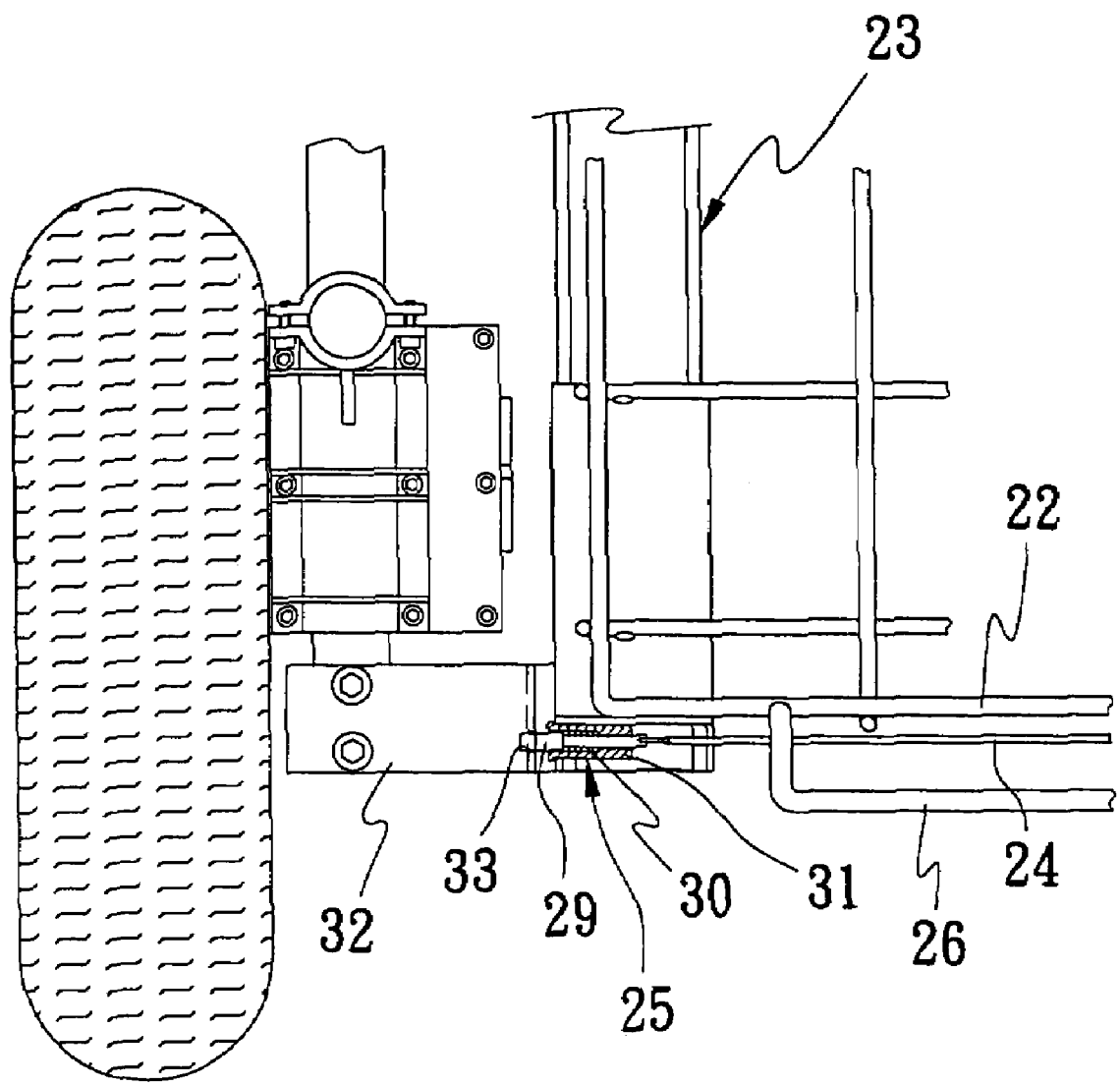
FIG. 4 is a schematic view of a battery box firmly located on the battery carrier sliding device of the electric wheelchair in accordance with the preferred embodiment of the present invention.

The present invention provides a practical example of utilizing a battery carrier sliding device for an electric wheelchair in FIG. 4. The diagram shows how a battery box can be located firmly on the battery carrier sliding device of the electric wheelchair in accordance with the preferred example of the present invention. The inserting shafts 29 of the flexible inserting units 25 are inserted into the holes 33 so that the battery box 22 can be secured firmly onto the battery carrier sliding device of the electric wheelchair. In order to restrict the movement of the battery box 22, the lockable units 21 are utilized to limit the movement of the batter box 22 along the horizontal direction of the of the central connecting point of the two wheels of the electric wheelchair.

Figure 5:
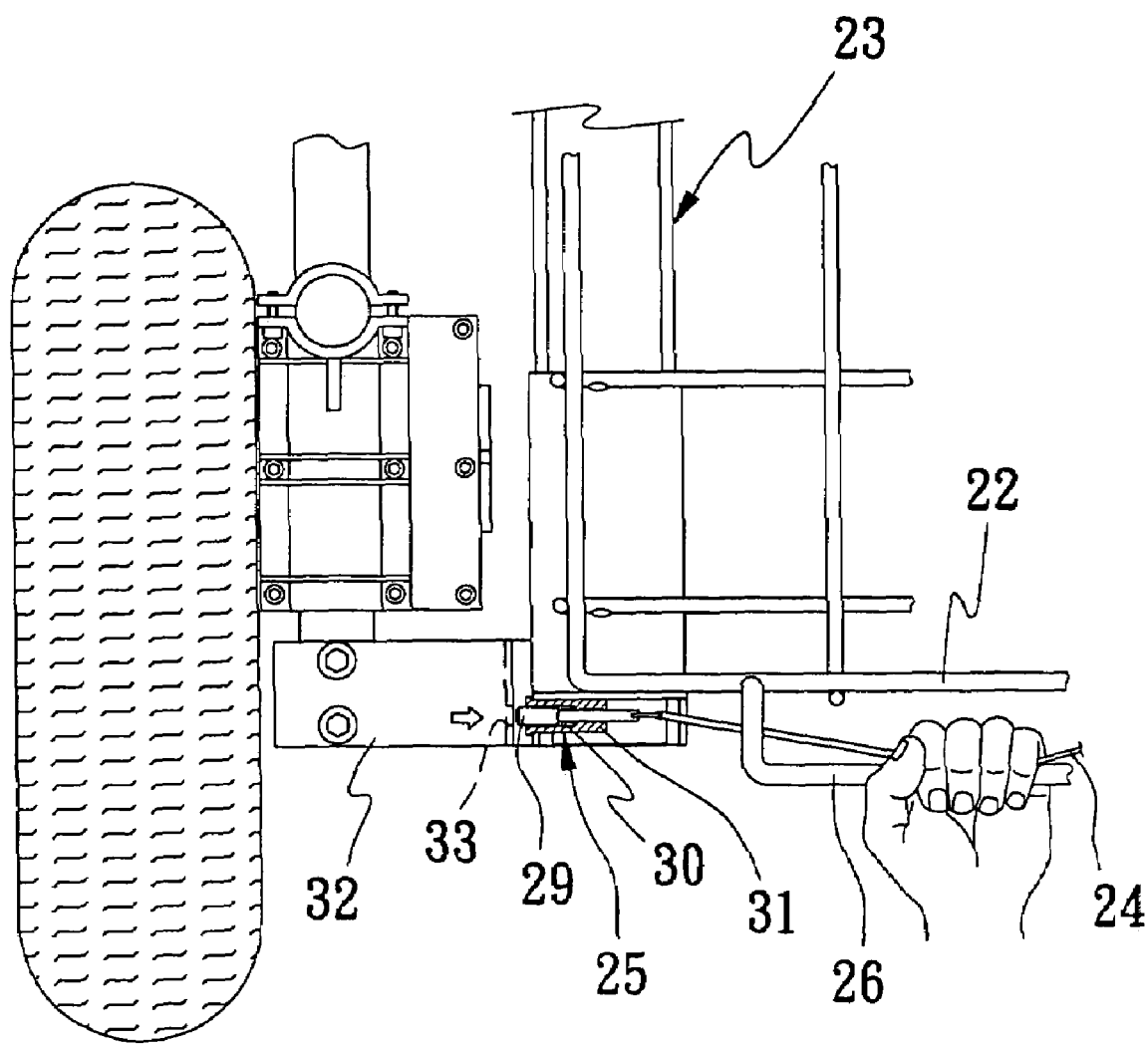
FIG. 5 is a schematic view of triggering a connecting belt of the battery box inside the battery carrier sliding device of the electric wheelchair in accordance with the preferred embodiment of the present invention.
Figure 6:
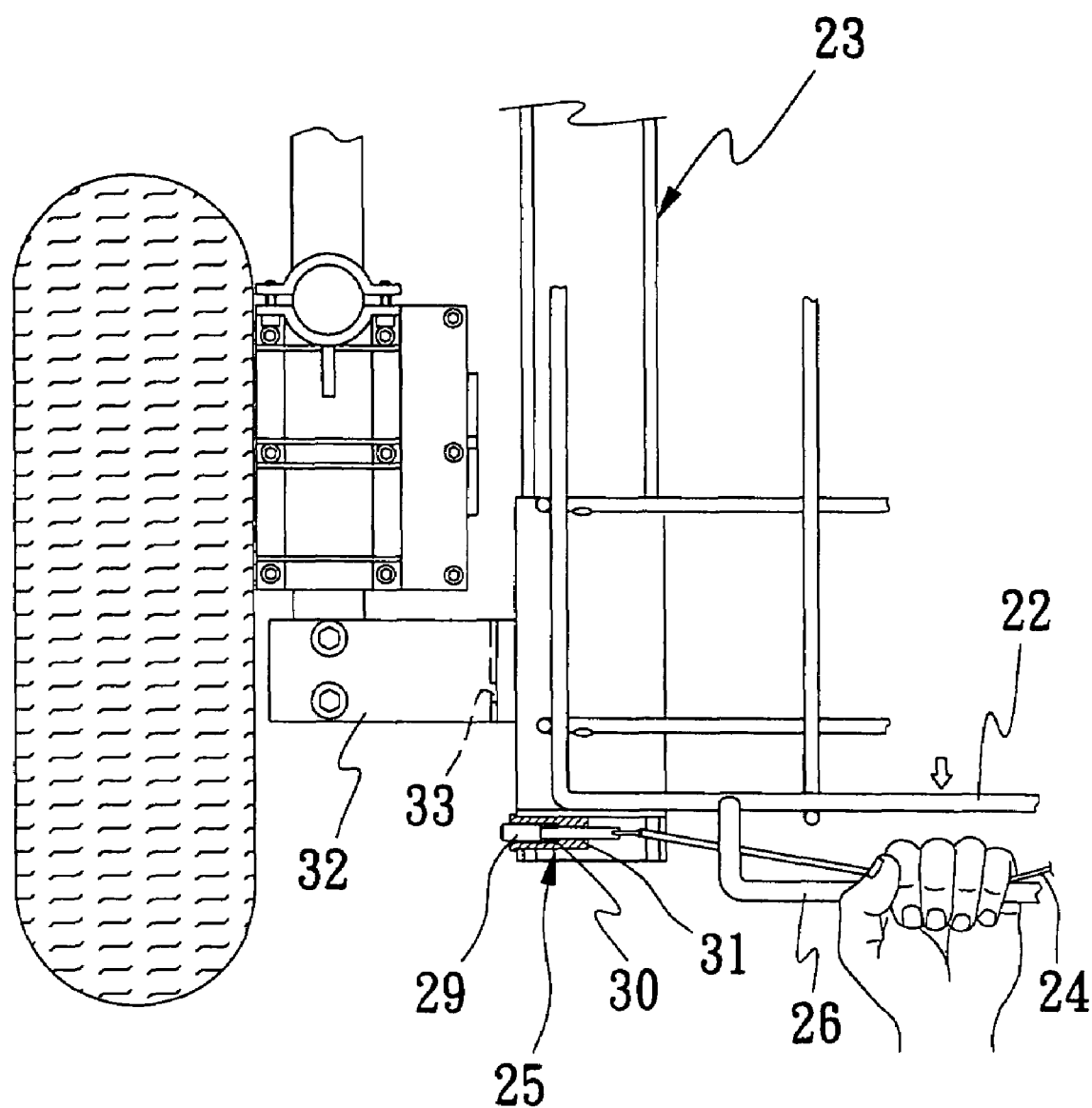
FIG. 6 is a schematic view of detaching the battery box from the battery carrier sliding device of the electric wheelchair in accordance with the preferred embodiment of the present invention.

FIG. 5 illustrates another practical example of showing how the battery box 22 can be disconnected from the electric wheelchair by triggering a connecting belt 24 in order to detach the battery box 22 from the battery carrier sliding device of the electric wheelchair. FIG. 5 demonstrates that by holding the handle 26 located on the battery box 22 and pulling the connecting belt 24 of the flexible inserting units 25 simultaneously, the inserting shafts 29 of the flexible inserting units 25 will be disengaged from the corresponding holes 33. FIG. 6 shows that once the connecting belt 24 is triggered, the battery box 22 is detached from the battery carrier sliding device of the electrical wheel chair. By manually pulling the connecting belt 24 with one hand, the battery box 22 can be disconnected from the battery carrier sliding device of the electric wheelchair. The battery box 22 can be reattached to the battery carrier sliding device of the electric wheelchair by following the procedure mentioned above in reverse.

The present invention provides an improved design of a battery carrier sliding device for the electric wheelchair. The battery box can be dislocated or reassembled to the electric wheelchair easily and conveniently. The battery box 22 of the present invention consists of a carrying function in which the structures or the types of batteries do not need to be altered. Various types of batteries can be utilized in the present invention. The present invention provides an improved battery box that can fulfill the needs of the market.

Other embodiments of the invention will appear to those skilled in the art from consideration of the specification and practice of the invention disclosed herein. It is intended that the specification and examples are to be considered as examples only, with the true scope and spirit of the invention being indicated by the following claims.

What is claimed is:

1. A battery carrier sliding device for an electric wheelchair, comprising:
   at least one sliding device, located on a supporting unit of the electric wheelchair;
   a battery box, located on the sliding device, wherein the battery box slides along a horizontal direction of a centre-line point of two wheels of the electric wheelchair, wherein a handle is formed on a locking surface of a lockable unit; and
   the lockable unit, further comprised of a connecting belt and two flexible inserting units, wherein the flexible inserting units are connected respectively to both ends of the connecting belt, the two flexible inserting units are located with respect to both ends of a locking surface of the battery box, further, two holes are formed on the supporting unit, wherein the two holes of the supporting unit are located to correspond to the two flexible inserting units so that the holes, the flexible inserting units and the connecting belt are connected in a same axis, the lockable unit is utilized to lock the battery box onto the electric wheelchair in order to restrict the horizontal sliding movement of the battery box along the centre-line point of the two wheels of the electric wheelchair.

2. The battery carrier sliding device of the electric wheelchair of claim 1, wherein the flexible inserting units further comprise an inserting shaft, a flexible element and a cover, wherein the inserting shaft comprises a flexible end and a connecting end, the inserting shaft is inserted inside the flexible element, and the cover shields the inserting shaft and the flexible element, the flexible end and the connecting end of the inserting shaft are both exposed outside the cover, both ends of the connecting belt of the lockable unit are connected respectively to the connecting ends of two inserting shafts.

3. The battery carrier sliding device of the electric wheelchair of claim 1, wherein the sliding device further comprises sliding trenches and two sliding bases, the battery box is located on the two sliding bases, and the two sliding base are located in the two sliding trenches so that the battery box can utilize the sliding bases to move along the sliding trenches in a horizontal direction.

* * * * *